(12) United States Patent
Marchuk et al.

(10) Patent No.: US 11,910,050 B2
(45) Date of Patent: Feb. 20, 2024

(54) DISTRIBUTED NETWORK RECORDING SYSTEM WITH SINGLE USER CONTROL

(71) Applicant: DELUXE MEDIA INC., Burbank, CA (US)

(72) Inventors: Andriy Marchuk, Santa Monica, CA (US); Gregory J. Taieb, Los Angeles, CA (US); Igor Skakovskyi, Los Angeles, CA (US); Stefan Lazarevic, Belgrade (RS); Nasik Shafeek, Kandy (LK)

(73) Assignee: DELUXE MEDIA INC., Burbank, CA (US)

( * ) Notice: Subject to any disclaimer, the term of this patent is extended or adjusted under 35 U.S.C. 154(b) by 86 days.

(21) Appl. No.: 17/327,467

(22) Filed: May 21, 2021

(65) Prior Publication Data

US 2022/0377409 A1 Nov. 24, 2022

(51) Int. Cl.
*H04N 21/43* (2011.01)
*G06F 16/432* (2019.01)
*H04N 21/2368* (2011.01)
*H04N 21/8547* (2011.01)
*G06F 16/438* (2019.01)

(52) U.S. Cl.
CPC ..... *H04N 21/43079* (2020.08); *G06F 16/433* (2019.01); *G06F 16/438* (2019.01); *H04N 21/2368* (2013.01); *H04N 21/8547* (2013.01)

(58) Field of Classification Search
CPC ......... H04N 21/43079; H04N 21/2368; H04N 21/8547; G06F 16/438; G06F 16/433
See application file for complete search history.

(56) References Cited

U.S. PATENT DOCUMENTS

| 10,388,273 B2 | 8/2019 | Garner et al. |
| 11,611,609 B2 | 3/2023 | Marchuk et al. |
| 2006/0274166 A1 | 12/2006 | Lee et al. |
| 2008/0092047 A1* | 4/2008 | Fealkoff ................. G11B 27/11 715/716 |
| 2008/0298768 A1* | 12/2008 | Isobe et al. ............ G11B 27/02 |
| 2010/0027959 A1* | 2/2010 | Obama ................. H04N 5/772 386/223 |
| 2010/0260482 A1 | 10/2010 | Zoor |
| 2011/0211524 A1 | 9/2011 | Holmes et al. |
| 2012/0041759 A1 | 2/2012 | Barker et al. |
| 2012/0246257 A1 | 9/2012 | Brown |
| 2015/0256613 A1 | 9/2015 | Walker et al. |

(Continued)

*Primary Examiner* — Sunghyoun Park
(74) *Attorney, Agent, or Firm* — Dorsey & Whitney LLP

(57) ABSTRACT

A master recording session at a server computer corresponds to a video content stored in memory accessible by the server computer. A first device and a second device are provided access to the master recording session and the master recording session is updated responsive to receipt of an update from the first device, where the update reflects initiation of playback of the video content at a time stamp corresponding to the timeline of the video content and includes an audio input configuration for the second device. The update is provided to the second device and an audio recording is received from the second device corresponding to a portion of the video content from the time stamp, where the audio recording is recorded by the second device using the implemented audio input configuration for the second device.

19 Claims, 5 Drawing Sheets

(56) References Cited

U.S. PATENT DOCUMENTS

| | | | |
|---|---|---|---|
| 2015/0296247 A1* | 10/2015 | Glasser | H04N 21/4325 |
| | | | 725/74 |
| 2016/0182855 A1 | 6/2016 | Caligor et al. | |
| 2018/0047386 A1 | 2/2018 | Garner et al. | |
| 2018/0181730 A1 | 6/2018 | Lyske | |
| 2019/0373306 A1* | 12/2019 | Yao | H04N 21/42221 |
| 2020/0228856 A1* | 7/2020 | Rivera | G07F 17/305 |
| 2022/0239269 A1* | 7/2022 | Min | G06F 11/32 |
| 2022/0377121 A1 | 11/2022 | Marchuk et al. | |
| 2022/0377407 A1 | 11/2022 | Marchuk et al. | |

\* cited by examiner

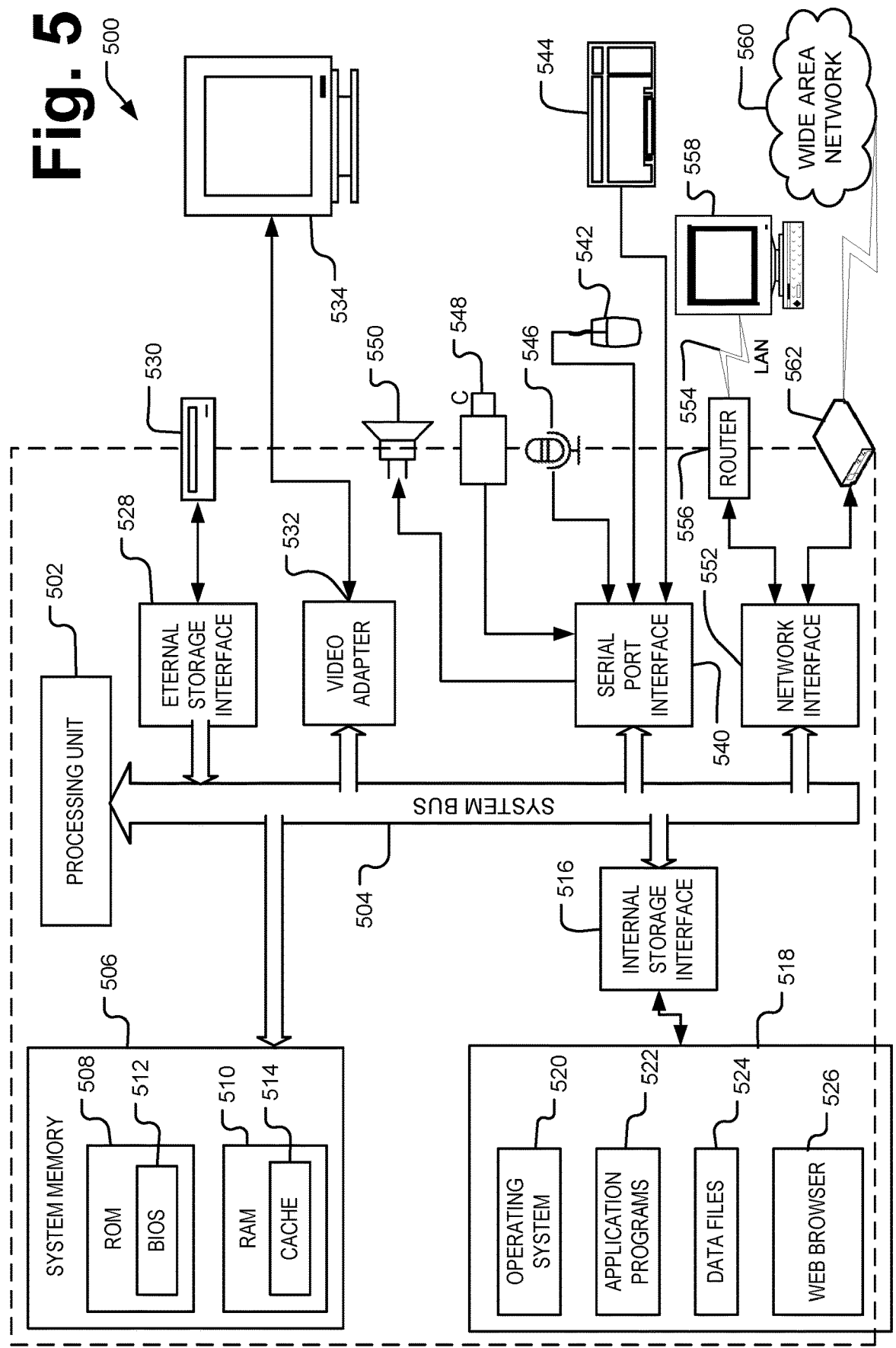

US 11,910,050 B2

DISTRIBUTED NETWORK RECORDING SYSTEM WITH SINGLE USER CONTROL

CROSS REFERENCE TO RELATED APPLICATIONS

This application is related to U.S. patent application Ser. No. 17/327,373, filed 21 May 2021 entitled "Distributed network recording system with true audio to video frame synchronization"; U.S. patent application Ser. No. 17/327, 540, filed 21 May 2021 entitled "Distributed network recording system with multi-user audio manipulation and editing"; and U.S. patent application Ser. No. 17/327,440, filed 21 May 2021 entitled "Distributed network recording system with synchronous multi-actor recording," all of which are incorporated by reference herein in their entireties for all purposes.

FIELD

The described embodiments relate generally to systems and methods to capture and edit audio for use with video content.

BACKGROUND

Audio recording sessions are carried out to digitally record voice-artists for a number of purposes including, but not limited to, foreign language dubbing, voice-overs, automated dialog replacement, or descriptive audio for the visually impaired. Recording sessions are attended by the actors/performers, one or more engineers, other production staff, and producers and directors. The performer watches video playback of the program material and reads the dialog from a script. The audio is recorded in synchronization with the video playback to replace or augment the existing program audio. Such recording sessions typically take place in a dedicated recording studio. Participants all physically gather in the same place. Playback and monitoring is then under the control of the engineer. In the studio, the audio recording is of broadcast or theater technical quality. The recorded audio is also synchronized with the video playback as it is recorded and the audio timeline is captured and provided to the engineer for review and editing.

The information included in this Background section of the specification, including any references cited herein and any description or discussion thereof, is included for technical reference purposes only and is not to be regarded subject matter by which the scope of the invention as defined in the claims is to be bound.

SUMMARY

The systems and methods described in the present disclosure enable remote voice recording synchronized to video using a cloud-based virtual recording studio within a web browser to record and review audio while viewing the associated video playback and script. All assets are accessed through or streamed within the browser application, thereby eliminating the need for the participants to install any applications or store content locally for later transmission. Recording controls, playback/record status, audio channel configuration, volume, audio timeline, script edits, and other functions may be synchronized across participants and may be controlled for all participants remotely by a designated user, typically a sound engineer, so that each participant sees and hears the section of the program being edited at the same time.

A method is described herein including generating a master recording session at a server computer, where the master recording session corresponds to a video content stored in memory accessible by the server computer and providing access to the master recording session at a first device and a second device. The master recording session is updated responsive to receipt of an update from the first device, where the update reflects initiation of playback of the video content at a time stamp corresponding to the timeline of the video content and includes an audio input configuration for the second device. The update is provided to the second device and an audio recording is received from the second device corresponding to a portion of the video content from the time stamp, where the audio recording is recorded by the second device using the implemented audio input configuration for the second device.

A system described herein includes a storage device for storing audio clips and a processing element associated with the storage device. The processing element is configured to generate a master recording session, where the master recording session corresponds to a video content stored in memory in communication with the processing element. The processing element further provides access to the master recording session at a first device and a second device and updates the master recording session responsive to receipt of an update from the first device, where the update reflects initiation of playback of the video content at a time stamp corresponding to the timeline of the video content and includes an audio input configuration for the second device. The processing element further provides the update to the second device and stores, at the storage device, an audio recording from the second device corresponding to a portion of the video content from the time stamp, where the audio recording is recorded by the second device using the implemented audio input configuration for the second device.

One or more non-transitory computer readable media described herein are encoded with instructions that, when executed by one or more processors of the server computer, cause the server computer to generate a master recording session at the server computer, where the master recording session corresponds to a video content stored in memory accessible by the server computer and provide access to the master recording session at a first device and a second device. The server computer further updates the master recording session responsive to receipt of an update from the first device, where the update reflects initiation of playback of the video content at a time stamp corresponding to the timeline of the video content and includes an audio input configuration for the second device. The server computer further provides the update to the second device and receives an audio recording from the second device corresponding to a portion of the video content from the time stamp, where the audio recording is recorded by the second device using the implemented audio input configuration for the second device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

The disclosure will be readily understood by the following detailed description in conjunction with the accompanying drawings, wherein like reference numerals designate like structural elements.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

FIG. 5 is a schematic diagram of a computer system that may be either a server computer or a client computer configured for implementing aspects of the recording system disclosed herein.

DETAILED DESCRIPTION

Figure 1:
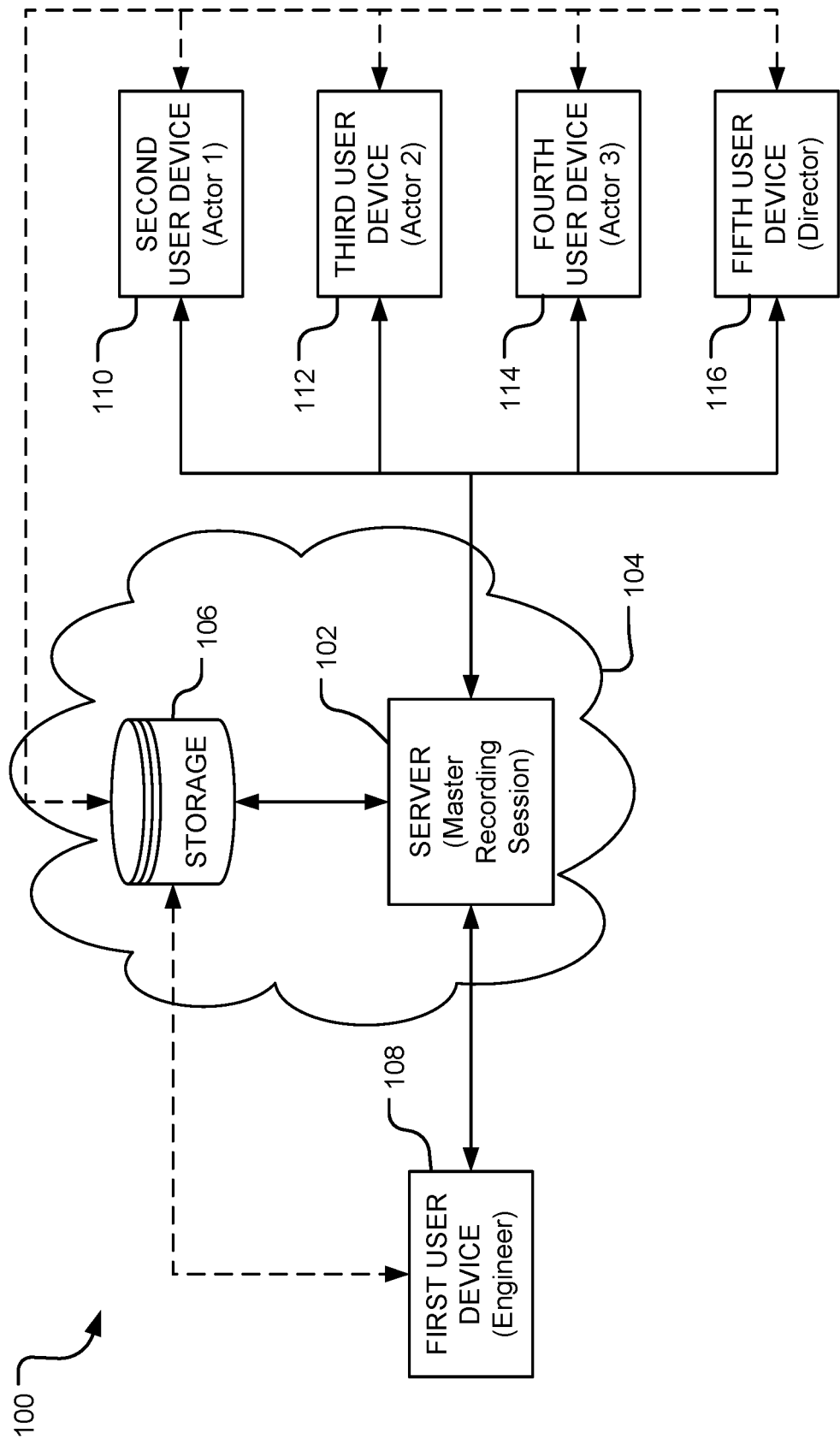
FIG. 1 is a schematic diagram of an embodiment of a system for conducting a remote audio recording session synchronized with video.

In the post-production process of film and video creation, the raw film footage, audio, visual effects, audio effects, background music, environmental sound, etc. are cut, assembled, overlayed, color-corrected, adjusted for sound level, and subjected to numerous other processes in order to complete a finished film, television show, video, or other audio-visual creation. As part of this process, a completed film may be dubbed into any number of foreign languages from the original language used by actors in the film. Often a distributed workforce of foreign freelance translators and actors are used for foreign language dubbing. In such scenarios, the translators and foreign language voice actors often access video and audio files and technical specifications for a project through a web-based application that streams the video to these performers for reasons of security to prevent unauthorized copies of the film to be made. The foreign language actors record their voice performances through the web-based application. Often these recordings are performed without supervision by a director or audio engineer, and, accordingly, actors may be responsible for technical tasks such as actuating microphones, selecting audio settings, and using the browser application correctly. Further, the recording quality through web-based browser applications is not of industry standard quality because the browser applications downsample and compress the recorded audio for transmission to a secure server collecting the voice file.

Other post-production audio recording needs arise when the original audio recording is faulty for some reason. For example, unwanted environmental noises (e.g., a car alarm) were picked up by the microphone during an actor's performance, sound levels were too low (or too high), the director ultimately did not like the performance by the actor in a scene, etc. Bringing actors, directors, audio engineers, and others back together post production to a studio to fix audio takes in scenes is expensive and time consuming. However, it is usually the only way to achieve a full, high-quality audio recording. Similar to the issues with foreign language audio dubbing described above, attempts to record remotely over a network have been performed with lossy compression files, such as Opus, to allow for low latency in transmission in an attempt to achieve approximate synchronization with the corresponding video frames. However, bandwidth and hardware differences can cause a greater delay due to buffering for one actor but not for another such that the dialog each records is not in synch with the other. There is always some lag due to the network bandwidth limitations on either end as well as encoding, decoding, and compressing the audio files. Thus, synchronization is generally not achieved and an audio engineer must spend significant time and effort to properly synchronize the audio recordings to the video frames. Also, sound captured and transmitted by streaming technologies is compressed and lossy; it cannot be rendered in full high-resolution, broadcast or theater quality and is subject to further quality degradation if manipulated later in the post production process. Further, if a director is involved in managing the actor during the audio dubbing process, there is usually a discrepancy between the streaming video playback viewed by the director and the streaming sound file received from the actor. The audio is out of synch with the video and the director is unable to determine whether the audio take synchronizes with the lip movement of the actor in the film content and whether another take is necessary.

The distributed network recording system disclosed herein addresses these problems and provides true synchronization between the audio recorded by the actor and the frames of the film content being dubbed. The system provides for the frame-synchronized recording of lossless audio files in full 48 kHz/24 bit sound quality, which is the film industry standard for high quality recorded audio files. The system controls a browser application on an actor's computer to record and cache a time-stamped, frame-synchronized, lossless, audio file locally and then upload the lossless audio file to a central server. The system further allows for immediate, in-session review of the synchronized audio and video among all session participants to determine whether a take is accurate and acceptable or whether additional audio recording takes are necessary. This functionality is provided by sending a compressed, time-stamped proxy audio file of the original lossless recording to each user device participating in the recording session, e.g., an audio engineer, multiple actors, a director, etc. The proxy audio file can be reviewed, edited, and manipulated by the participants in the recording session and final time synchronized edit information can be saved and associated with the original, lossless audio file to script the final audio edit for the dubbed film content.

The distributed network recording system may be utilized and configured to provide a controller user (e.g., an engineer) with an interface to control various aspects of the recording session for each participant in the recording session. For example, the controller user may control video playback, configure audio input settings for participants in the recording session, and actuate microphones of participants to record audio from the participants. Accordingly, actors participating in the recording session may focus on performance without learning how to use additional software for recording. Further, selection of a particular microphone accessible by an actor, as well as selection of particular settings for the microphone may improve recording quality without having an actor facilitate changing settings locally.

A controller user may be selected from among users provided access to the master recording session and may, in some implementations, change during the session. As actors join the master recording session, the controller may view and adjust their audio settings, including selecting a microphone or audio source and adjusting settings for the microphone at the actor's device. The controller may initiate playback of video content, such as a video content, at the actor's device. At a desired time, such as when a video frame including the actor's dialogue is approaching, the controller can actuate a microphone local to the actor's device, where the actuation of the microphone is synchronized or otherwise tied to the playback of the video content. For example, the system may record metadata regarding a time stamp with respect to the video content as to when the microphone was actuated, with the time stamp corresponding to a master timeline of the video content.

When the microphone is actuated, the actor provides an audio contribution in response to viewing the video content and the actor device records the audio contribution (e.g., dialogue) as a local audio clip, e.g., audio content or a file. The audio clip stored on the actor device may then be transmitted to a server and/or storage location. For example, the audio clip may be transmitted in one or more segments or chunks to a server, where the transmission may occur during recording and/or after the recording is terminated. In many embodiments, the audio segments are deleted after transfer and/or encrypted so as to prevent access to the track by the actor. This helps to ensure that the audio clips are not released by an unauthorized party and helps to maintain control over the content. Time stamp information and other data corresponding to the video content and actuation timing may be stored with the recorded audio clips and transmitted to the server with the respective segments and/or audio clips. The time stamp information allows the audio clips to be synchronized to the video content in the centralized session, and distributed to all participants.

The controller may initiate playback of the audio clip synchronized to the video content after recording, allowing for evaluation of the actor's performance from the professional quality recording and a decision on whether to record more takes. In various embodiments, audio may be edited during the master session by one or more users given editing permission. The audio clips may further be provided to a separate editing program for further editing after the master session has ended.

An exemplary distributed network recording system 100 for capturing high-quality audio from a remotely located actor is depicted in FIG. 1. The system 100 includes a server 102 that instantiates a master recording session. The server 102 also acts as a communication clearinghouse within the communication network 104, e.g., the Internet "cloud," between devices of the various participants in the master recording session. The server 102 may be a single device that directly manages communications with the participant devices or it may be a collection of distributed server devices that work in cooperation with each other to enhance speed of delivery of data, e.g., primarily video/audio files to each of the participant devices. For example, the server 102 may comprise a host server that manages service to and configuration of a web browser interface for each of the participant devices. The server 102 may be include a scalable cloud hosting service, for example, Amazon Web Services (AWS). In addition, the server 102 may include a group of geographically distributed servers forming a content delivery network (CDN) that each store a copy of the video files used in the master recording session. Geographic distribution of the video files allows for lower time latency in the streaming of video files to participant devices. The server 102 may further be implemented using both distributed server devices and single servers.

The server 102 is also communicatively connected to a storage device 106 that provides file storage capacity for recorded audio files, proxy audio files as further described below, metadata collected during a recording session, a master digital video file of the film being dubbed, application software objects and modules used by the server 102 to instantiate and conduct the master recording session, and other data and media files that may be used in a recording session. As with the server 102, the storage device 106 may be a singular device or multiple storage devices that are geographically distributed, e.g., as components of a CDN.

A number of participant or user devices may be in communication with the server 102 to participate in the master recording session. For example, each of the user devices may connect with the computer server over the Internet through a browser application by accessing a particular uniform resource locator (URL) generated to identify the master recording session. The number of devices, as well as the permissions assigned to each of the devices will vary depending on the number of actors, roles, and the like. Accordingly, the discussion of any particular number and type of device or participant type or role is meant as illustrative only.

A first user device 108 may be a personal computer or other computing device (e.g., a tablet, smartphone, etc.) at a remote location associated with an audio engineer. The audio engineer may be provided with credentials to primarily control the master recording session on user devices of other participants. A second user device 110 may be a personal computer or other computing device at a remote location associated with a first actor to be recorded as part of the master recording session. A third user device 112 may be a personal computer or other computing device at a remote location associated with a second actor to be recorded as part of the master recording session. A fourth user device 114 may be a personal computer or other computing device at a remote location associated with a third actor to be recorded as part of the master recording session. A fifth user device 116 may be a personal computer or other computing device at a remote location associated with a director of the film reviewing the audio recordings made by the actors and determining acceptability of performances during the master recording session.

The user devices 108-116 communicate with the server 102, which transmits control information to the user devices 108-116 during the master recording session. Likewise, the user devices 108-116 may transmit control requests or query responses to the server 102, which may then forward related instructions to one or more of the user devices 108-116 (i.e., each of the user devices 108-116 is individually addressable and all are collectively addressable). Session data received from any of the user devices 108-116 received by the server 102 may be passed to the storage device 106 for storage in memory. Additionally, as indicated by the dashed communication lines in FIG. 1, the user devices 108-116 may receive files directly from the storage device 106 or transmit files directly to the storage device 106, for example, if the storage device 106 is a group of devices in a CDN. For example, the storage device 106 in a CDN configuration may directly stream the video film contents being dubbed or proxy audio files as further described herein to the user devices 108-116 to reduce potential latency in widely geographically distributed user devices 108-116. Similarly, the user devices 108-116 may upload audio files created locally during the master recording session directly to the storage device 106, e.g., in a CDN configuration at the direction of the computer server 102.

Figure 2:
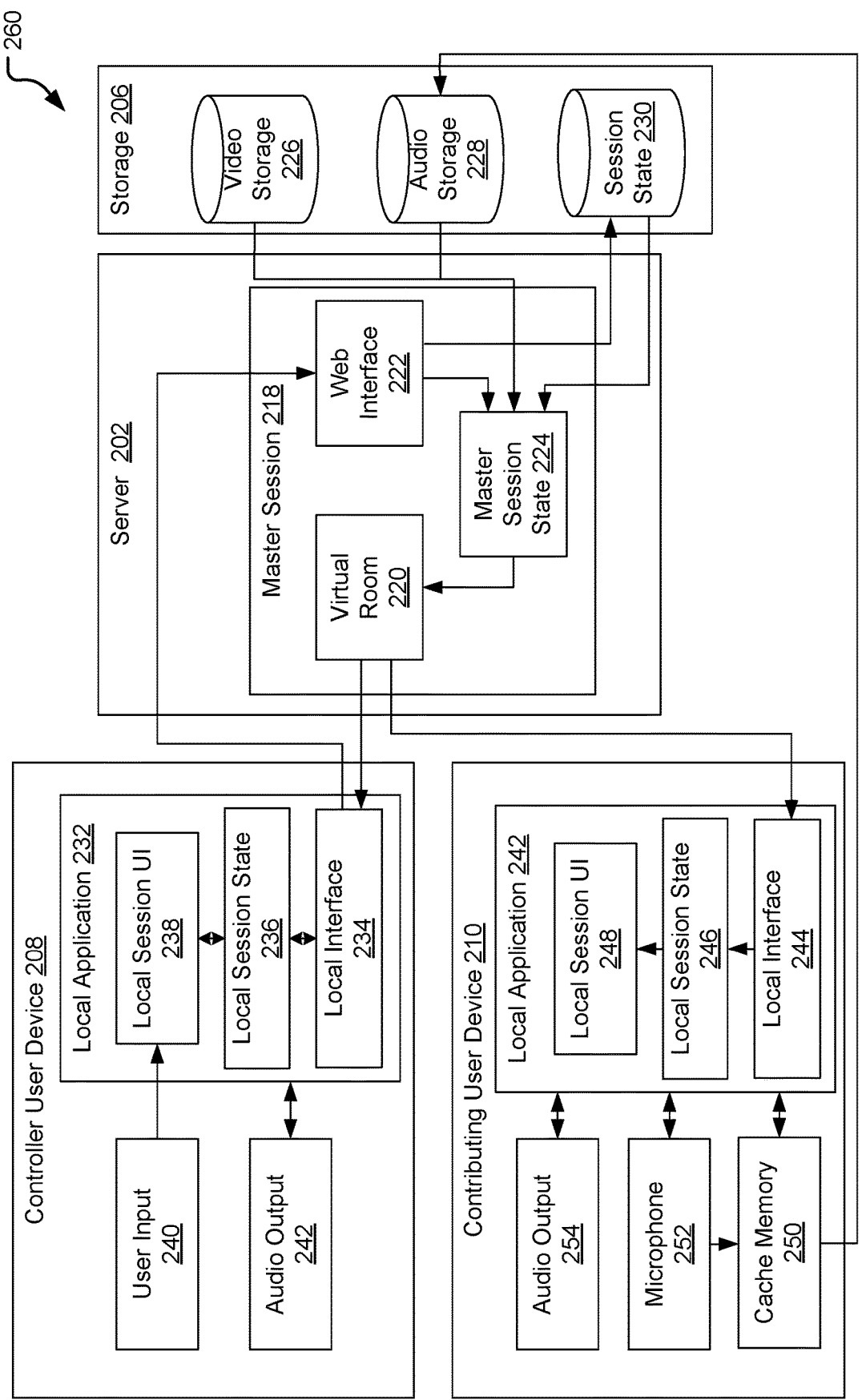
FIG. 2 is a schematic diagram of an example remote audio recording session including a server application, a controller user device, and a contributing user device.

FIG. 2 is a schematic diagram of an example distributed network recording system 260, where the first user device, which may be referred to as the controller user device 208 and the second user device, which may be referred to as the contributing user device 210 are provided access to the master session 218 hosted at the server 202. The master session 218 may include a web interface 222, a master session state 224, and a virtual room 220. The master session may access storage 206, which may include video storage 226, audio storage 228, and storage for a session state 230. The controller user device 208 may execute a local application 232 to access the master session 218 and the contributing user device 210 may execute a local application 242 to access the master session 218. At the controller user device 208, the local application 232 may include a local interface 234, a local session state 236, and a local session user interface 238. The local application 232 may be configured to receive user input 240 through one or more input devices of the controller user device 208 and may access audio output devices 242 of the controller user device 208. At the contributing user device 210, the local application 242 may include a local interface 244, a local session state 246, and a local session user interface 248. The local application 242 may access various components of the contributing user device 210, including cache memory 250, a microphone 252, and audio output devices 254.

The server 202 may be, in various implementations, a physical computing device including at least processing and storage, several physical computing devices (e.g., a cluster of computing nodes), and/or one or more distributed server devices or services, such as scalable cloud hosting services or CDNs. The master session 218 may be instantiated at the server 202 by execution of executable instructions by one or more processors of the server 202. In various implementations, the master session 218 may be implemented as an application and may execute within several virtual machines, containers, or combinations thereof, which may be distributed across different computing platforms.

The master session 218 may provide communications between user devices included in a distributed network recording system, maintain state information for the master session 218, and communicate with storage resources to provide, for example, video content and recorded audio to various user devices provided access to the master session 218 (e.g., devices included in the distributed network recording system). The master session may further receive updates and inputs from the devices provided access to the master session 218 and provide local interfaces to the master session 218 to the user devices provided with access to the master system.

The master session 218 may also configure connections between local applications at the user devices and the master sessions based on user types corresponding to the user devices included in the master session 218. In some implementations, each user device may be associated with a user type, where each user type has differing permissions with respect to the master session 218. For example, the first user device is configured as the controller user device 208, such that the local session user interface 238 may provide updates to the master session 218. The second user device is configured as the contributing user device 210, which does not provide updates to the master session 218, but provides updates (e.g., audio recordings) to audio storage 228 utilized by the master session 218. In various embodiments, the contributing user device type may be further divided into other user types, such as an actor user device, an editor user device, and a director user device, each having different permissions to the master session 218 based on the role played in the recording session by an actor, editor, or director.

The master session 218 may include various software components for accomplishing various tasks of the master session 218, such as the virtual room 220, the web interface 222, and the master session state 224. For example, the virtual room 220 may communicate with the controller user device 208 and the contributing user device 210 to provide, for example, instructions for local rendering of user interfaces 238 and 248 for the master session. The web interface 222 may receive updates to the master session from the local application 232 at the controller user device 208 and provide the updates to the stored session state 230 as well as the master session state 224. The master session state 224 may communicate any changes to the stored master session state 230 to the virtual room 220 for transmission to the controller user device 208 and the contributing user device 210. The virtual room 220, the web interface 222, and the master session state 224 are provided as an example of software components which may be used to implement the master session 218. In various implementations, additional or fewer components may be provided to implement the master session 218 and components may perform different functions with respect to the master session 218.

The virtual room 220 may communicate with the controller user device 208 and the contributing user device 210 through the local interface 234 and the local interface 244, respectively. The virtual room 220 may, in some implementations, be implemented using a websocket server and may communicate with the controller user device 208 and the contributing user device 210 using websocket command protocols. The virtual room 220 may also be implemented on various other types of servers and may communicate using other protocols, such as HTTP.

In various embodiments, the virtual room 220 may provide instructions to the user devices 208 and 210 to render the local session user interface 238 and the local session interface 248. The instructions may differ based on the type of user, such that a different interface is rendered at the controller user device 208 and the contributing user device 210. For example, the local session user interface 238 at the controller user device 208 may include options for providing input, such as play head updates, playback initiation, etc. In contrast, the local session user interface 248 at the contributing user device 210 may include a video content portion without controls for video playback. In some implementations, the virtual room 220 may communicate additional information to one or both of the controller user device 208 and the contributing user device 210. For example, the virtual room 220 may provide information about the microphone 252 of the contributing user device 210 to the controller user device 208 when the contributing user device 210 is provided access to the master session 218. The information about the microphone 252 may include, in various examples, types, audio characteristics, current settings, possible settings, etc. of microphones usable by the contributing user device 210. The virtual room 220 may further provide changes to audio input configuration to the contributing user device 210. Audio input configuration may include, in various examples, selection of a different microphone for recording, actuation of a microphone, settings of the microphone, deactivating (e.g., muting) the microphone, etc.

In some implementations, the virtual room 220 may further retrieve media (e.g., audio and video) from audio storage 228 and/or video storage 226 for playback at the controller user device 208 and the contributing user device 210. In some implementations, the virtual room 220 may provide information to the contributing user device 210 and the controller user device 208 to retrieve or stream audio and/or video directly from the video storage 226 and/or the audio storage 228, such as access credentials to stream the audio or video, timecodes, etc. Where the virtual room 220 retrieves media for playback through streaming to the controller user device 208 and the contributing user device 210, the virtual room may also alter the media (e.g., by placing a watermark over streaming video showing the user's e-mail address or other identifier) to discourage capturing streaming video by user devices participating in the master session 218.

The web interface 222 may generally receive commands, updates, queries, and other information from the user device 208 and 210, and may route information within the master session 218, or to other locations, such as storage 206. For example, the web interface 222 may receive an update from the controller device 208, and may update both the session state 230 at storage 206 and the master session state 224 within the master session 218. In some implementations, updating the session state 230 may include merging updates received from the controller device 208 into the session state 230. For example, the web interface 222 may receive a command from the controller device 208 to begin video playback for the master session 218. The command may include a playhead location, which may be a timestamp relative to the timeline of the video. The web interface 222 may communicate the playhead location to the session state 230 and the master session state 224. The master session state 224 may then update the state, communicating the update to the contributor device 210. The video may then playback on the contributing user device 210 beginning at the playhead location received from the controller user device 208. Other updates may include, for example, audio playback synced with video playback, updates to audio input configurations (e.g., actuating or muting a microphone, updating audio settings of a microphone, or switching between available microphones), changes in user device permissions (e.g., having another user become the control user during the session), etc.

The master session state 224 may store various information about the recording session including, for example, user devices with access to the session, user types corresponding to the user devices, current playhead location relative to the timeline of the video content, location of recorded audio relative to the timeline of the video content, audio input device settings for contributor users, etc. The master session state 224 may update by incorporating any updates received from the web interface 222. In various implementations, the master session state 224 may retrieve initial state information from the session state 230 at the storage 206. The master session state 224 may, in some embodiments, retrieve video content from video storage 226 and/or audio content from audio storage 228 for streaming to the controller user device 208 and the contributing user device 210.

The storage 206 accessible by the server 202 and utilized by the master session 218 may include video storage 226, audio storage 228, and/or session state 230. In some embodiments, the storage 206 may be implemented by multiple physical storage devices in a distributed network. The video storage 226, audio storage 228, and session state 230 may be co-located on a single device, multiple devices in the same physical location, or across a distributed storage network. Further, in some embodiments, some portion of the storage 206 may be co-located with the server 202, while other portions of the storage 206 are distributed. For example, the session state 230 may be local to the server 202, while the video storage 226 and the audio storage 228 are not.

The local application 232 may, in various implementations, be a web-based application, such that the local application 232 executes within a browser program of the controller user device 208. In some implementations, the local application 232 may be provided as a desktop, mobile, or other type of application with instructions stored by the controller user device 208. Where the local application 232 executes within a browser program, the local application 232 may be configured to, for example, prevent download of streaming video content, audio recordings, or other aspects of the master recording session 218 to the controller device 208. Various embodiments of the local application 232 may further be configured to execute in a "sandbox" or other execution environment controlling access of the local application 232 to other locations of the controller user device 208. The local application 232 may, however, be configured to access various hardware components of the controller user device 208, such as audio output 242.

The local application 232 is configured for the user device 208 associated with the controller user type. Accordingly, the local session user interface 238 is configured to receive user input 240, which may be, for example, selection of recording buttons for actors, actuation of playback control for video and/or audio, and selecting other controls within the local session user interface. A local session state 236 of the local application 232 may update responsive to user input 240 to the local session user interface 238. For example, where the user input 240 changes the location of the playhead relative to the timeline of the video content, the local session state may update to reflect the current playhead location. The local session state 236 may be provided to the local interface 234 responsive to a change in the state, and the local interface 234 may communicate the change to the web interface 222 of the master session 218 to update the master session state 224. The local interface 234 may also receive updates from the virtual room 220 (e.g., to sync with the master session 218) in addition to providing updates to the web interface 222. The ability to provide updates to the web interface 222, thereby updating the master session 218, may be unique to a local application rendered at a user device associated with the controller role, such as the controller user device 208.

The local application 242 generally executes in a similar computing environment as the local application 232. For example, the local application 242 may execute within a browser program of the contributing user device 210. In other implementations, the local application 242 may be provided as a desktop, mobile, or other type of application with instructions stored by the contributing user device 210. Where the local application 242, executes within a browser program, the local application 242 may, for example, prevent download of streaming video, audio recordings, or other aspects of the master recording session 218. In various embodiments, the local application 242 may execute in a "sandbox" or other execution environment controlling communications and access between the local application 242 and the contributing user device 210. The local application 242 may be configured to access various hardware components of the contributing user device 210 such as cache memory 250, one or more microphones 252 and one or more audio outputs 254. In various embodiments, the local application 242 may access microphones 252 to change audio settings and actuate microphones for recording audio. The application 242 may access cache memory 250 to store audio recordings as the contributing user is recording audio, sending audio recordings in small portions to audio storage 228. Accordingly, audio recordings may be inaccessible by a user of the contributing user device 210, and may be erased upon termination of the local application 242 and/or clearing the cache memory 250 of the contributing user device 210.

The local application 242 includes a local interface 244 which receives updates to the master session 218 and/or the master session state 224 from the virtual room 220. In some implementations, the local interface 244 may automatically push received updates to the local session state 246 and the local session user interface 248 as they are received from the virtual room 220. The local interface 244 may also have a "sync" state where the received updates are automatically pushed to the local session state 246 and a "not synced" state where received updates are queued or otherwise not processed by the local interface 244 until the local interface 244 is returned to the sync state. Controls for moving between the sync state and the not synced state may be provided as part of the local session user interface 248 based on user type. For example, director and editor users may be able to turn off the sync option to more closely review audio recordings and/or edit audio recordings while other users continue to record, updating the master session state 224. While the local application 242 may communicate with the master session 218 to receive updates from the virtual room 220, the local application generally does not include elements for updating the master session state 224. For example, the local session user interface 248 may allow limited or no user input and the local interface 244 may not communicate information to the web interface 222 to update the master session state 224.

While the distributed recording session 260 is shown with two user devices 208 and 210, the master session 218 may, in various embodiments, provide access to the master session 218 to any number of user devices, including multiple actors (e.g., where dialogue is being recorded in the session). Further, access permissions of each user device may vary based on the implementation and user roles or types involved in the recording session.

Figure 3:
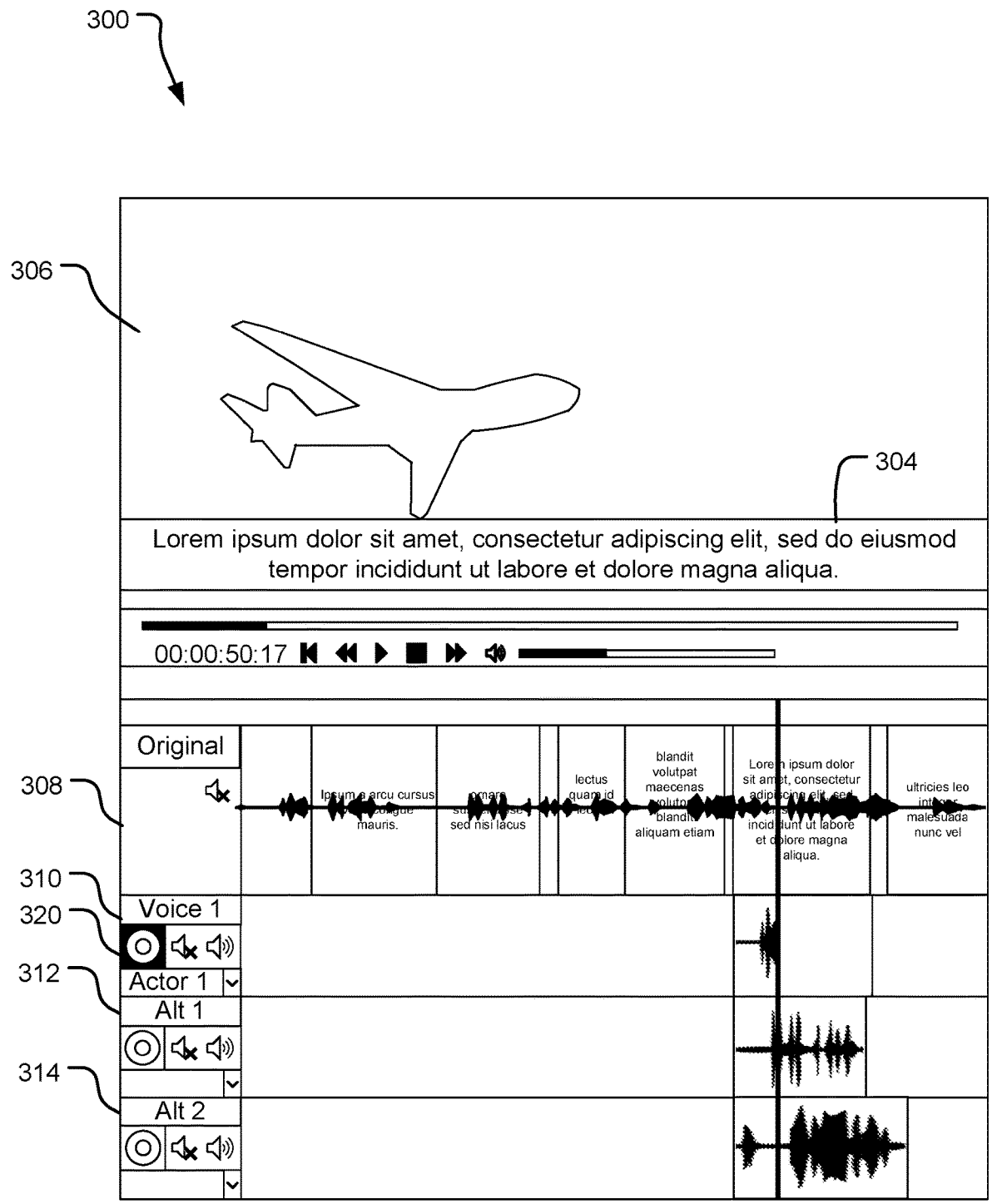
FIG. 3 is an example user interface of a remote audio recording session in accordance with various embodiments of the disclosure.

FIG. 3 is an example user interface 300 for a remote audio recording session in accordance with various embodiments of the disclosure. State information for the user interface 300 may be, for example, provided by the master session 218 to the controller user device 208 and rendered by the controller user device 208 within the local application 232 as the local session user interface 238. The user interface 300 may include a video content portion (e.g., media player area) used to present the video content playback on the user device 208, e.g., the video content plays within the designated video content portion 306 window. The video content portion 306 window may include additional features, such as a script area 304 showing words of the script in conjunction with the video content.

The user interface 300 may also include multiple timeline areas, e.g., master timeline 308 and one or more actor timelines 310, 312, 314. The actor timelines, may, in some embodiments reflect individual actors recording different audio files (e.g., separate characters). In other embodiments, such as the user interface 300 in FIG. 3, additional timelines 312, 314 may be used to save alternative recordings for a director or editor to choose from for the final product. The master timeline 308 may illustrate actor lines to be recorded and other audio present in the original video content (e.g., background music, sound effects, etc.). In some embodiments, the master timeline 308 may also illustrate a combination of actor audio files relative to a playback timeline or synchronized to the video content timeline. In other words, the master timeline 308 includes information regarding the audio files that are to be recorded or that have been recorded at select points in time of frames of the video content. In some instances, there may be two or more audio files configured to record at the same points in time, e.g., two actors involved in a dialogue. In other instances, a single audio file may be recorded, followed by a recording of another audio file.

The user interface 300 further includes icons 320 to issue recording commands to other user devices (e.g., the contributing user device 210). When selected, the recording icons may generate a recording command for the contributing user device 210, which may be provided to the master session 218 as an update to be communicated to the contributing user device 210 to actuate the microphone 252 of the contributing user device 210. The user interface 300 further includes visual features that allow the controller user to update the master recording session, such as controls to begin playback of the video content, stop and start recording for the various user devices, edit the audio playback, update audio input configurations for the various user devices, and so on.

Figure 4:
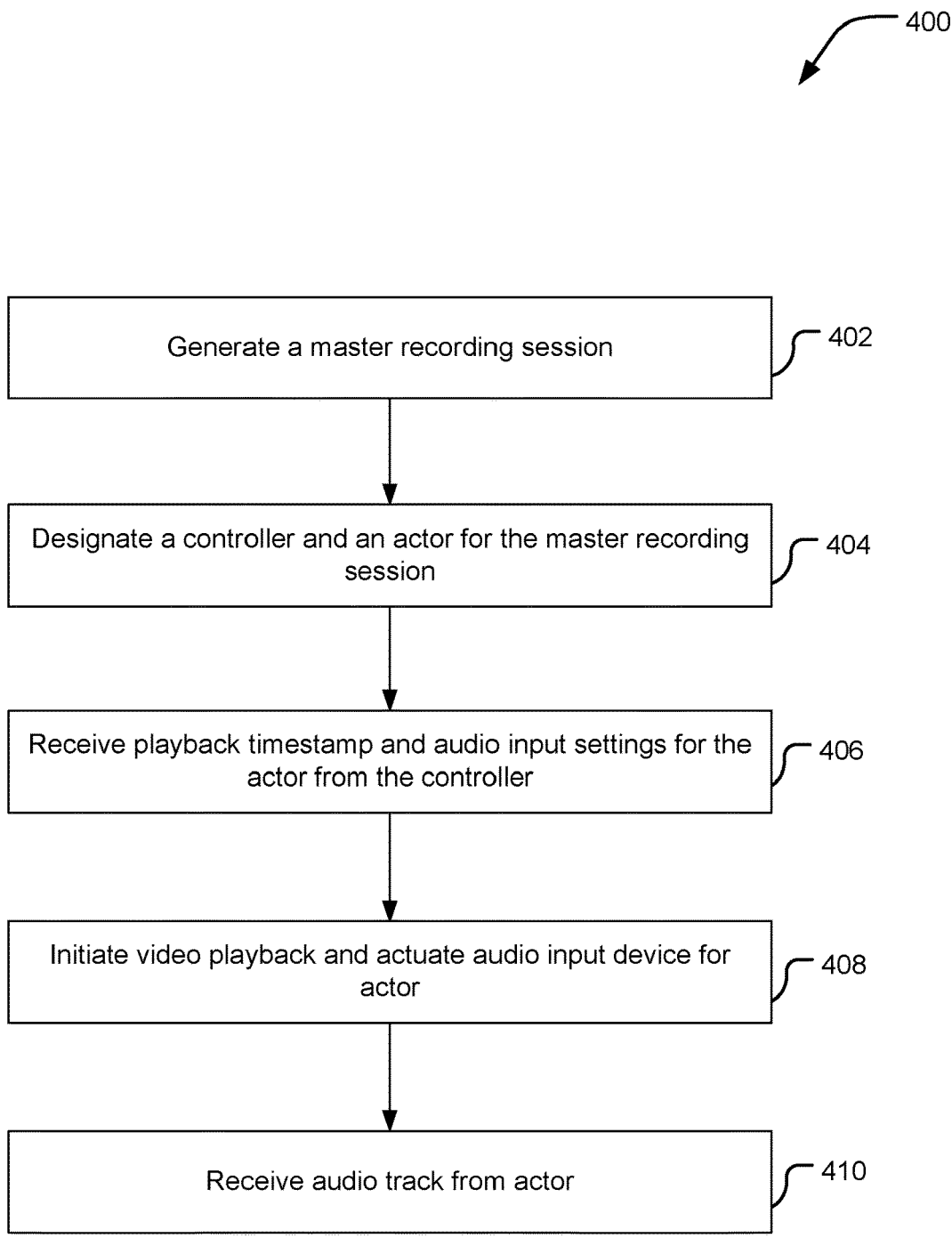
FIG. 4 is a flow diagram of steps for an example remote audio recording session in accordance with various embodiments of the disclosure.

FIG. 4 is a flow diagram of steps 400 for an example remote audio recording session in accordance with various embodiments of the disclosure. At step 402, the server 202 generates a master recording session 218. The master recording session 218 may be generated responsive to a request from a user, such as the controller user device 208 to begin a master recording session. In some implementations, the master recording session 218 may be pre-configured to begin on the server at a predetermined time. Along with generating the master recording session, the server 202 may initialize a master session state 224 by retrieving a previously saved session state 230 from storage 206 or may initialize the master session state 224 in accordance with pre-configured settings or parameters included with the request to generate the master session 218.

User devices may access the master recording session 218 via a web browser. For example, the user devices 208 and 210 may navigate to the virtual room 220 by providing a URL corresponding to the virtual room 220 into the browser. In other examples, the master recording session 218 may be accessed by an application stored on the user devices 208, 210, which may then communicate with the server 202 to receive information. In some embodiments, access to the virtual room hosting the master recording session may be controlled, such that the users are required to input access credentials, e.g., login information, such as a user name and password, which are then analyzed by the server 202 to determine whether the user is authorized to access the master recording session.

At step 404, the master session 218 designates a controller and an actor for the master recording session. In some embodiments, the controller and actor user types may be predetermined and communicated to the server 202 via personalized URLs or other identifiers of the users or user devices. In other embodiments, users may select their respective role or user type when providing access information to the server. Where more than one actor is participating in the master session 218, the master session 218 may further assign particular roles to the actors in a similar manner. Users may be assigned other user types, such as editor and/or director, in a similar manner.

At step 406, the master session 218 receives a playback timestamp and audio input settings for the actor from the controller. The playback timestamp generally reflects a location of a playhead when the controller user initiates playback of the video content at the controller user device 208. The timestamp may reference a time code with respect to the master timeline, reference a particular frame of the video content, or use other references to reflect playback location of the video content. For example, the user of the controller device 208 may press a "play" button the user interface 200, which may then transmit a command to the server 202 hosting the master recording session. The command may, in some implementations, update the local session state 236 of the local application 232 and may be provided to the server 202 by a communication from the local interface 234 to the web interface 222 of the master session 218. The master session state 224 may then be updated to reflect the play command.

The play command causes the server 202 to access the video content, such as stored at the video content server on the storage 206, and begin playback of the video content. The video content is then streamed from the storage 206 to other user devices participating in the master recording session 218 (e.g., the browser on the user devices) to display the video content as it is played. Importantly, the video content does not need to be downloaded as an entire package and stored, rather it can be streamed, e.g., packets or fragments may be downloaded to the local user devices during streaming, but the packets or fragments are discarded after being displayed. In this manner, the video content, which may include unreleased television or movie content, is not accessible to the users outside of the master recording session, helping prevent theft and leaks of the content.

The audio input settings may be provided to the server 202 before, at the same time, or after playback of the video content begins at the controller device 208. For example, the controller user may select audio input settings for the contributing user device 210 before beginning playback, to take effect when playback of the video content begins. In some implementations, the controller user may select the recording button on the user interface 200 after beginning playback at the controller user device 208. The audio input settings may, in various examples, actuate a microphone at the actor device 210 for recording, deactivate (e.g., mute) a microphone during video playback, change audio settings of a microphone at the actor device 210 (e.g., adjusting filter settings to control characteristics of the sound being recorded by the microphone), and/or select a microphone for use by the actor device 210. In some cases, there may be two or more actor devices selected for recording, and each of the selected user devices may receive audio input settings actuating their respective microphones for recording. The audio input settings may also be associated with a time stamp relative to the master timeline of the video content. The time stamp may be the same timestamp provided to begin playback (e.g., recording begins when playback begins) or may be earlier or later than the timestamp for beginning playback. The time stamp associated with the audio input settings correlates the audio recording to the video playback.

At step 408, the master session 218 communicates with the contributor user device 210 to initiate video playback and actuate an audio input device at the contributor user device 210. As audio is captured by the user device 210 (e.g., by the microphone 252), the audio may be stored in cache memory 250 or other memory of the user device. Audio recordings may include time stamp information corresponding to the video playback. Where an audio recording is included in one file, the timestamp may correspond to the timestamp associated with the audio input settings (e.g., when the microphone 252 was actuated to begin recording). Where the time stamp corresponds to the video content time, the audio content can be synchronized back to the video content without requiring a user to have recorded at exactly the same time the video was played at the controller user device 208. In one embodiment, the audio content is stored on the local memory, e.g., random access memory (RAM) on the user device 210 during recording. The audio may optionally be encrypted while stored, to prevent the user or others from accessing the content while on the local device.

The master session 218 receives access to an audio clip provided by the actor at step 410. Audio content or audio clips may be received from the user device 210. For example, the user device 210 may transmit the audio content in chunks or segments to the storage 206 and/or server 202. In some embodiments, the audio segments may be deleted from the local storage on the user device 210 (e.g., cache 250) as the audio segments are received at the storage 206. In one embodiment, the audio segments are transmitted at predetermined increments, e.g., every 5 mb, to allow continuous transfer during the master recording session, so as to reduce a transfer delay that may occur after the recording is complete. Utilizing predetermined increments, such as 5 mb segments, the transfer process between the user device and the storage for any given packet is quick and does not monopolize the bandwidth for the network, allowing the playback of the video content in the master recording session to not be noticeably impacted. In some implementations, audio segments may remain in the cache 250 until the cache 250 is cleared, uploading the audio segments to storage 206. The controller user device 208 may include controls to clear the cache of other user devices, to cause transfer of audio segments from the user device 210 to storage 206.

In various embodiments, the controller device 208 may send further commands to terminate recording at the user device 210. The audio segments may then be compiled into a studio track for the user device 210. The audio clips or audio content may be stored with the metadata, including time stamp information in the storage 206. In many embodiments, the audio clips may be the original content as received directly from the user device 210 and may include a high-quality audio, e.g., 24-bit 48 kHz. The server 202 may then utilize metadata of the audio clip to synchronize the track with the video content, such that start time and/or stop time of the audio clip is linked to the corresponding location in the video content file. The location may be a time stamp and/or frame identification. In some embodiments, the audio content may be edited after recordation. The edit information may also be stored in the storage 206 (either separate from or with the audio content). The edit information may include, e.g., trim, fade, loudness, and other features that may have been modified by the editor with respect to the original audio content. In one embodiment, the audio content and the edit information may be exportable, e.g., downloadable or accessed, by other software programs, such as editing programs, that may be separate from the master recording session.

When the audio clip is synchronized with the video content, the controller device 208 may select playback of the compilation of the video and audio content. For example, the controller device 208 may replay the video content and play the audio clips as synchronized to the video content, and may provide updates to the master session 218 to replay the video content and synchronized audio for all user devices synched to the master session 218. In some embodiments, the playback of the audio content may also include application of any edits or the like made to the audio clips after receipt from the recording user devices. In some embodiments, the playback during the master recording session may not utilize the original audio content as stored on the storage 206. Rather, playback during the master recording session may utilize a proxy that may be generated based on the audio content. The proxy may have a lower quality and thus a reduced size, reducing the bandwidth required for playback of the compilation.

An exemplary computer system 500 is depicted in FIG. 5. One or more of the user devices 108-116 and the server 102 may be implemented by a computer system 500. The computer system of a sender or a recipient (e.g., an engineer, editor, actor, director, etc.) may be a personal computer (PC), a workstation, a notebook or portable computer, a tablet, a smartphone, or other device with internal processing and memory components as well as interface components for connection with external input, output, storage, network, and other types of peripheral devices. The server 102 may be one or more computer devices providing web services, database services, file storage and access services, and application services among others. Internal components of the computer system in FIG. 5 are shown within the dashed line and external components are shown outside of the dashed line. Components that may be internal or external are shown straddling the dashed line.

The computer system 500 includes a processor 502 and a system memory 506, which may be connected by a system bus 504 that also operatively couples various system components. In some embodiments, such as a distributed computing system, additional buses or other communication architectures may be provided to pass data and/or control information between processors, system memory, peripheral devices, and any other hardware components within a system. There may be one or more processors 502, e.g., a single central processing unit (CPU), or a plurality of processing units, commonly referred to as a parallel processing environment (for example, a dual-core, quad-core, or other multi-core processing device). The one or more processors 502 may include additional types of processors, such as graphics processing units (CPUs), microcontrollers, microprocessors, embedded processors, media processors, etc. The system bus 504 may be any of several types of bus structures including a memory bus or memory controller, a peripheral bus, a switched-fabric, point-to-point connection, and a local bus using any of a variety of bus architectures. The system memory 506 may include read only memory (ROM) 508 and random access memory (RAM) 510. A basic input/output system (BIOS) 512, containing the basic routines that help to transfer information between elements within the computer system 500, such as during start-up, is stored in ROM 508. A cache 514 may be set aside in RAM 510 to provide a high speed memory store for frequently accessed data.

A local internal storage interface 516 may be connected with the system bus 504 to provide read and write access to a data storage device 518 directly connected to the computer system 500, e.g., for nonvolatile storage of applications, files, and data. The data storage device 518 may be a solid-state memory device, a magnetic disk drive, an optical disc drive, a flash drive, or other storage medium. A number of program modules and other data may be stored on the data storage device 518, including an operating system 520, one or more application programs 522, and data files 524. In some implementations (e.g., where the computer system 500 is implementing any of the user devices 108-116, the data storage device 518 may store instructions for implementing a web browser 526, which may provide an execution environment for the local application 132 of the distributed network recording system. In other embodiments or implementations (e.g., where the computer system 500 is implementing the server 102), the data storage device 518 may store instructions for implementing the master session 118. Note that the data storage device 518 may be either an internal component or an external component of the computer system 500 as indicated by the data storage device 518 straddling the dashed line in FIG. 5. In some configurations, there may be both an internal and an external data storage device 518.

The computer system 500 may further include an external data storage device 530. The data storage device 530 may be a solid-state memory device, a magnetic disk drive, an optical disc drive, a flash drive, or other storage medium. The external storage device 530 may be connected with the system bus 504 via an external storage interface 528 to provide read and write access to the external storage device 530 initiated by other components or applications within the computer system 500. The external storage device 530 (and any associated computer-readable media) may be used to provide nonvolatile storage of computer-readable instructions, data structures, program modules, and other data for the computer system 500. Additionally, the computer system 500 may access remote storage devices (e.g., "cloud" storage) over a communication network (e.g., the Internet) as further described below.

A display device 534, e.g., a monitor, a television, a projector, or other type of presentation device may also be connected to the system bus 504 via an interface, such as a video adapter 540 or video card. In addition to the display device 534, the computer system 500 may include other peripheral input and output devices, which may be connected to the processor 502 and memory 506 through the serial port interface 544 coupled to the system bus 504. Input and output devices may also or alternately be connected with the system bus 504 by other interfaces, for example, a universal serial bus (USB A/B/C), an IEEE 1394 interface ("Firewire"), a Lightning port, a parallel port, or a game port, or wirelessly via Bluetooth or other protocol. A user may enter commands and information into the computer system 500 through various input devices including, for example, a keyboard 543 and a pointing device 542, for example, a mouse. Other input devices (not shown) may include, for example, a joystick, a game pad, a tablet, a touch screen device, a scanner, a facsimile machine, a microphone, a digital camera, and a digital video camera. Additionally, audio and video devices such as a microphone 546, a video camera 548 (e.g., a webcam), and external speakers 550, may be connected to the system bus 504 through the serial port interface 544 with or without intervening specialized audio or video cards card or other media interfaces (not shown). The audio and video devices may also be connected to the computer system 500 through wireless protocols such as Bluetooth or Wi-Fi.

The computer system 500 may operate in a networked environment using logical connections through a network interface 552 coupled with the system bus 504 to communicate with one or more remote devices. The logical connections depicted in FIG. 5 include a local-area network (LAN) 554 and a wide-area network (WAN) 560. Such networking environments are commonplace in home networks, office networks, enterprise-wide computer networks, and intranets. These logical connections may be achieved by a communication device coupled to or integral with the computer system 500. As depicted in FIG. 5, the LAN 554 may use a router 556 or hub, either wired or wireless, e.g., via IEEE 802.11 protocols, internal or external, to connect with remote devices, e.g., a remote computer 558, similarly connected on the LAN 554. The remote computer 558 may be another personal computer, a server, a client, a peer device, a mobile device, or other common network node, and typically includes many or all of the elements described above relative to the computer system 500.

To connect with a WAN 560, the computer system 500 may utilize a modem 562 for establishing communications over the WAN 560. Typically the WAN 560 may be the Internet. However, in some instances the WAN 560 may be a large private network spread among multiple locations, or a virtual private network (VPN). The modem 562 may be a telephone modem, a high-speed modem (e.g., a digital subscriber line (DSL) modem), a cable modem, or similar type of communications device. The modem 562, which may be internal or external, may be connected to the system bus 504 via the network interface 552. In various embodiments the modem 562 may be connected via the serial port interface 544. It should be appreciated that the network connections shown are exemplary and other means of and communications devices for establishing a network communications link between the computer system and other devices or networks may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method comprising:
generating a master recording session at a server computer, wherein the master recording session corresponds to a video content stored in memory accessible by the server computer, and wherein the server computer comprises a cloud-based hosting service;
providing access to the master recording session at a first device at a first location corresponding to a first user and a second device at a second location corresponding to a second user, wherein the first location of the first device is different from the second location of the second device;
updating the master recording session responsive to receipt of an update from the first device, wherein the update reflects initiation of playback of the video content at a time stamp corresponding to the timeline of the video content and includes an audio input configuration for the second device, wherein the audio input configuration includes one or more settings controlling the actuation, deactivation, sound filtering, and sound quality settings for a microphone of the second device;
providing the update to the second device at the second location, wherein the update further comprises changing local settings of the second device at the second location; and
receiving an audio recording from the second device corresponding to a portion of the video content from the time stamp, wherein the audio recording is recorded using the microphone of the second device using the one or more settings for the microphone of the second device of the implemented audio input configuration for the second device.

2. The method of claim 1, wherein the update from the first device is an update to a first local state of the master recording session located at the first device, wherein updating the master recording session comprises updating a master recording session state located at the server computer, wherein providing the update to the second device comprises updating a second local state of the master recording session located at the second device to reflect the master recording session state.

3. The method of claim 1, wherein providing access to the master recording session at the first device comprises providing an interface to the master session on a browser program of the first device, wherein input to the interface at the first device initiates update of the master session.

4. The method of claim 1, wherein providing access to the master recording session at the second device comprises providing an interface to the master session on a browser program of the second device, wherein the interface at the second device updates responsive to update of the master session and the master session is unmodifiable from the interface at the second device.

5. The method of claim 1, further comprising providing access to the master recording session at a third device at a third location that corresponds to a third user, wherein the third location of the third device is different from the first location of the first device and the second location of the second device, and wherein the update received from the first device further includes an audio input configuration for the third device.

6. The method of claim 5, further comprising initiating, at the second device and the third device, playback of the video content at the time stamp with the audio recording received from the second device responsive to a second update received from the first device reflecting initiation of playback of the video content at the time stamp in conjunction with the audio recording received from the second device at the first device, wherein the audio input configuration for the second device comprises prohibiting the second device from recording while the third device is recording.

7. The method of claim 1, further comprising providing access to the master recording session at a third device and providing, to the first device, information about one or more microphones coupled to the third device.

8. The method of claim 1, wherein providing access to the master recording session at the first device comprises providing an interface to the master session on a browser program of the first device, wherein input to the interface at the first device initiates update of the master session.

9. The method of claim 1, wherein providing access to the master recording session at the second device comprises providing an interface to the master session on a browser program of the second device, wherein the interface at the second device updates responsive to update of the master session and the master session is unmodifiable from the interface at the second device.

10. The method of claim 1, wherein the first device is coupled to a first local network and the second device is coupled to a second local network that is different from the first local network of the first device, and wherein the first device communicates with the second device over the cloud-based hosting service.

11. The method of claim 1, further comprising:
after receiving the audio recording from the second device, prohibiting access by the first device and the second device to the audio recording and the video content stored in the memory;
verifying, at the master recording session, that the received audio recording lines up with the video content stored in the memory;
prohibiting access by the first device and the second device to the master recording session;
editing, at the master recording session, the video content stored in the memory with the received audio recording, to combine the received audio recording with the video content;
storing the combined video content and received audio recording in the memory; and
deleting, at the master recording session, the original video content stored in the memory and the received audio recording.

12. A system comprising
a storage device for storing audio clips; and
a processing element associated with the storage device configured to:

generate a master recording session, wherein the master recording session corresponds to a video content stored in memory in communication with the processing element, and wherein the system comprises a cloud-based hosting service;
provide access to the master recording session at a first device at a first location corresponding to a first user and a second device at a second location corresponding to a second user, wherein the first location of the first device is different from the second location of the second device;
update the master recording session responsive to receipt of an update from the first device, wherein the update reflects initiation of playback of the video content at a time stamp corresponding to the timeline of the video content and includes an audio input configuration for the second device, wherein the audio input configuration includes one or more settings controlling the actuation, deactivation, sound filtering, and sound quality settings for a microphone of the second device;
provide the update to the second device at the second location, wherein the update further comprises changing local settings of the second device at the second location; and
store, at the storage device, an audio recording from the second device corresponding to a portion of the video content from the time stamp, wherein the audio recording is recorded using the microphone of the second device using the one or more settings for the microphone of the second device of the implemented audio input configuration for the second device.

13. The system of claim 12, wherein the update from the first device is an update to a first local state of the master recording session located at the first device, wherein updating the master recording session comprises updating a master recording session state located at the system, wherein providing the update to the second device comprises updating a second local state of the master recording session located at the second device to reflect the master recording session state.

14. The system of claim 12, wherein providing access to the master recording session at the first device comprises providing an interface to the master session on a browser program of the first device, wherein input to the interface at the first device initiates update of the master session.

15. The system of claim 12, wherein providing access to the master recording session at the second device comprises providing an interface to the master session on a browser program of the second device, wherein the interface at the second device updates responsive to update of the master session and the master session is unmodifiable from the interface at the second device.

16. One or more non-transitory computer readable media encoded with instructions that, when executed by one or more processors of a server computer, cause the server to:
generate a master recording session at the server computer, wherein the master recording session corresponds to a video content stored in memory accessible by the server computer, and wherein the server computer comprises a cloud-based hosting service;
provide access to the master recording session first device at a first location corresponding to a first user and a second device at a second location corresponding to a second user, wherein the first location of the first device is different from the second location of the second device;

update the master recording session responsive to receipt of an update from the first device, wherein the update reflects initiation of playback of the video content at a time stamp corresponding to the timeline of the video content and includes an audio input configuration for the second device, wherein the audio input configuration includes one or more settings controlling the actuation, deactivation, sound filtering, and sound quality settings for a microphone of the second device;

provide the update to the second device at the second location, wherein the update further comprises changing local settings of the second device at the second location; and receive an audio recording from the second device corresponding to a portion of the video content from the time stamp, wherein the audio recording is recorded using the microphone of the second device using the one or more settings for the microphone of the second device of the implemented audio input configuration for the second device.

17. The one or more non-transitory computer readable media of claim 16, wherein the update from the first device is an update to a first local state of the master recording session located at the first device, wherein updating the master recording session comprises updating a master recording session state located at the server computer, wherein providing the update to the second device comprises updating a second local state of the master recording session located at the second device to reflect the master recording session state.

18. The one or more non-transitory computer readable media of claim 16, wherein the instructions further cause the server computer to provide access to the master recording session at a third device at a third location that corresponds to a third user, wherein the third location of the third device is different from the first location of the first device and the second location of the second device, and wherein the update received from the first device further includes an audio input configuration for the third device.

19. The one or more non-transitory computer readable media of claim 18, wherein the instructions further cause the server computer to initiate, at the second device and the third device, playback of the video content at the time stamp with the audio recording received from the second device responsive to a second update received from the first device reflecting initiation of playback of the video content at the time stamp in conjunction with the audio recording received from the second device at the first device, wherein the audio input configuration for the second device comprises prohibiting the second device from recording while the third device is recording.

* * * * *